United States Patent
Montcalm

(10) Patent No.: US 11,361,258 B2
(45) Date of Patent: Jun. 14, 2022

(54) SYSTEM AND METHOD FOR CALL TIMING AND ANALYSIS

(71) Applicant: Mitel Networks Corporation, Ottawa (CA)

(72) Inventor: Michael Montcalm, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/953,470

(22) Filed: Nov. 20, 2020

(65) Prior Publication Data

US 2021/0073691 A1 Mar. 11, 2021

Related U.S. Application Data

(62) Division of application No. 15/940,838, filed on Mar. 29, 2018, now Pat. No. 10,878,348.

(30) Foreign Application Priority Data

Mar. 31, 2017 (EP) ...................... 17164179

(51) Int. Cl.
| | |
|---|---|
| *G06Q 10/06* | (2012.01) |
| *G06Q 10/10* | (2012.01) |
| *G06Q 10/00* | (2012.01) |
| *H04M 3/42* | (2006.01) |
| *H04M 3/51* | (2006.01) |

(52) U.S. Cl.
CPC ........... *G06Q 10/063* (2013.01); *G06Q 10/00* (2013.01); *G06Q 10/0639* (2013.01); *G06Q 10/06398* (2013.01); *G06Q 10/10* (2013.01); *G06Q 10/109* (2013.01); *G06Q 10/1091* (2013.01); *H04M 3/42221* (2013.01); *H04M 3/5183* (2013.01); *H04M 2203/401* (2013.01)

(58) Field of Classification Search
CPC ...... G06Q 10/06; G06Q 10/063; G06Q 10/00; G06Q 10/0639; G06Q 10/06398; G06Q 10/10; G06Q 10/109; G06Q 10/1091; H04M 3/42221; H04M 3/5183; H04M 2203/401

See application file for complete search history.

(56) References Cited

U.S. PATENT DOCUMENTS

| | | | |
|---|---|---|---|
| 4,460,070 A | 7/1984 | Meyer et al. | |
| 4,513,391 A | 4/1985 | Maddock | |
| 5,917,905 A * | 6/1999 | Whipple | H04M 1/2473 379/356.01 |
| 6,532,003 B2 | 3/2003 | Nagao | |
| 6,707,811 B2 * | 3/2004 | Greenberg | H04L 29/1216 370/352 |
| 7,526,081 B1 * | 4/2009 | Vashisht | G06Q 20/10 379/355.07 |
| 7,836,412 B1 | 11/2010 | Zimmerman | |
| 8,762,356 B1 | 6/2014 | Kogan | |

(Continued)

*Primary Examiner* — Tung S Lau

(57) ABSTRACT

A system and method for detecting a start and end of section keystrokes, measuring a section time between the start and end of section keystrokes; aggregating the measured section time with previously measured section times; comparing the aggregate of the measured section times with a section target time; and sending an alert when a difference between the aggregate of the measured section times and the section target time is greater than a predetermined threshold.

3 Claims, 5 Drawing Sheets

(56) References Cited

U.S. PATENT DOCUMENTS

| | | |
|---|---|---|
| 10,462,023 B1 | 10/2019 | Montcalm |
| 10,469,660 B2 * | 11/2019 | Engelke .............. H04M 1/2473 |
| 2001/0038624 A1 * | 11/2001 | Greenberg ............ H04L 61/157 |
| | | 370/352 |
| 2004/0230479 A1 | 11/2004 | Ikeda |
| 2006/0167995 A1 | 7/2006 | Rui |
| 2006/0265090 A1 | 11/2006 | Conway et al. |
| 2007/0036282 A1 * | 2/2007 | Engelke ................. G10L 15/26 |
| | | 379/52 |
| 2007/0230449 A1 * | 10/2007 | Arai .................... H04M 1/2535 |
| | | 370/352 |
| 2007/0280464 A1 * | 12/2007 | Hughes ................ H04Q 3/0016 |
| | | 379/205.01 |
| 2008/0118054 A1 * | 5/2008 | Mcardle ............. H04M 1/6033 |
| | | 379/388.02 |
| 2008/0152100 A1 | 6/2008 | Kondziela |
| 2008/0262904 A1 | 10/2008 | Conway et al. |
| 2009/0006525 A1 | 1/2009 | Moore |
| 2014/0136940 A1 | 5/2014 | Breslau et al. |
| 2014/0181529 A1 | 6/2014 | Joyce, III |
| 2017/0075797 A1 | 3/2017 | Ekambaram et al. |
| 2018/0101679 A1 | 4/2018 | Gunter et al. |
| 2018/0277093 A1 | 9/2018 | Carr et al. |
| 2019/0332876 A1 | 10/2019 | Khitrov et al. |

\* cited by examiner

SYSTEM AND METHOD FOR CALL TIMING AND ANALYSIS

CROSS REFERENCE TO RELATED APPLICATION

This application is a divisional of, and claims priority to, U.S. patent application Ser. No. 15/940,838 filed Mar. 29, 2018, titled "SYSTEM AND METHOD FOR CALL TIMING AND ANALYSIS," which claims the benefit and priority of European Patent Application No. EP 17164179.8 entitled "SYSTEM AND METHOD FOR CALL TIMING AND ANALYSIS," filed on Mar. 31, 2017, the contents of which are hereby incorporated herein by reference.

FIELD OF THE INVENTION

The present invention relates to a system configured to provide a new voice call analysis technique by measuring subsection call times and comparing these with predetermined thresholds.

BACKGROUND OF THE INVENTION

In a call centre environment, agents are often required to read aloud scripted sections of text and to record the called parties' response. Existing systems record only the total call length to use as a measure of agent performance. A technique is therefore required which allows a call server to measure and analyse calls in greater detail and to automatically analyse the calls without extra burden on the agents.

SUMMARY OF THE INVENTION

A first aspect of the invention provides a method comprising: detecting a start of section keystroke; detecting an end of section keystroke; measuring a section time between the start of section keystroke and the end of section keystroke; aggregating the measured section time with previously measured section times; comparing the aggregate of the measured section times with a section target time; and sending an alert when a difference between the aggregate of the measured section times and the section target time is greater than a predetermined threshold.

The method may further comprise recording the section time in a server and the aggregating, comparing and sending may be performed by the server. The start of section keystroke may indicate a start of a user recited script. The end of section keystroke may indicate an end of data entry following the user recited script.

The previously measured section times may relate to a single user.

Alternatively, the previously measured section times may relate to multiple users. The section target time may be predetermined. Alternatively, the section target time may be dynamically updated based on an aggregate of measured section times of a subset of users.

The method may further comprise displaying the section target time in response to detecting the start of section keystroke. The method may further comprise displaying a section of scripted text and, in response to detecting the start of section keystroke, providing a visual indication of a target reading speed on the scripted text, the target reading speed resulting in the scripted text being recited in the section target time.

The method may further comprise determining a time required to read a section of text based on average reading speed; sending the section of text to a remote device; and preventing the sending of further text to the remote device until the determined time has elapsed.

A second aspect of the invention provides a system configured to: detect a start of section keystroke; detect an end of section keystroke; measure a section time between the start of section keystroke and the end of section keystroke; aggregate the measured section time with previously measured section times; compare the aggregate of the measured section times with a section target time; and send an alert when a difference between the aggregate of the measured section times and the section target time is greater than a predetermined threshold.

A third aspect of the invention provides a non-transitory computer-readable storage medium having stored thereon computer-readable code, which, when executed by computing apparatus, causes the computing apparatus to: detect a start of section keystroke; detect an end of section keystroke; measure a section time between the start of section keystroke and the end of section keystroke; aggregate the measured section time with previously measured section times; compare the aggregate of the measured section times with a section target time; and send an alert when a difference between the aggregate of the measured section times and the section target time is greater than a predetermined threshold.

A fourth aspect of the invention provides an apparatus comprising:
  means for detecting a start of section keystroke; means for detecting an end of section keystroke; means for measuring a section time between the start of section keystroke and the end of section keystroke; means for aggregating the measured section time with previously measured section times; means for comparing the aggregate of the measured section times with a section target time; and means for sending an alert when a difference between the aggregate of the measured section times and the section target time is greater than a predetermined threshold.

A fifth aspect of the invention provides an apparatus comprising at least one processor and at least one memory including computer program code, the at least one memory and the computer program code configured to, with the at least one processor, cause the apparatus at least to: detect a start of section keystroke; detect an end of section keystroke; measure a section time between the start of section keystroke and the end of section keystroke; aggregate the measured section time with previously measured section times; compare the aggregate of the measured section times with a section target time; and send an alert when a difference between the aggregate of the measured section times and the section target time is greater than a predetermined threshold.

BRIEF DESCRIPTION OF THE DRAWINGS

Embodiments will now be described, by way of example only, with reference to the accompanying drawings, in which.

DETAILED DESCRIPTION

Figure 1:
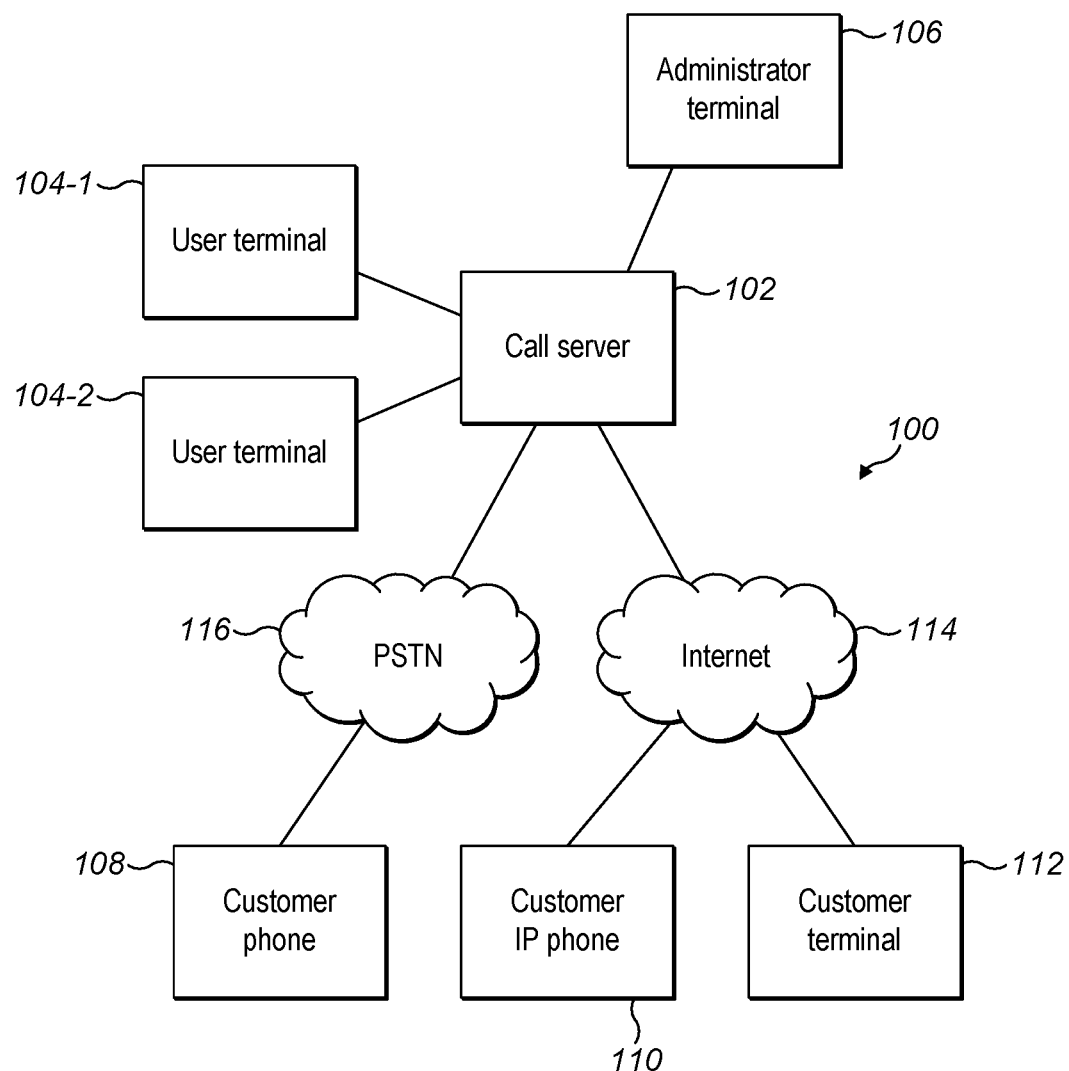
FIG. 1 is a schematic illustration of an exemplary telephony system in which the invention can be implemented.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 shows an example embodiment of a telephony system 100 for timing and analyzing voice call subsections.

The telephony system 100 comprises a call server 102, which may for example be a Private Branch Exchange (PBX) server, an internet protocol (IP) call server, or another type of server configured to receive and route telephonic information. The call server 102 may be embodied in a single apparatus or may be distributed across a number of different apparatus. Although not shown in the Figures, the call server 102 includes at least one processor and at least one electronic memory operatively coupled to the at least one processor for controlling operation of the call server. The call server also includes a number of other components which allow the call server to communicate with external apparatus and to control its internal functions. These are not shown to avoid obscuring the invention.

The telephony system 100 comprises a number of user terminals, including a first user terminal 104-1 and a second user terminal 104-2. The first and second user terminals are connected to the call server 102. Only two user terminals are shown in FIG. 1 for simplicity, but it will be appreciated that the system may comprise a large number of separate user terminals connected to the call server 102. The telephony system 100 also includes an administrator terminal 106. The administrator terminal 106 may be the same as the user terminals, or it may have additional components and/or functionality. Both the user terminals 104-1, 104-2 and the administrator terminal 106 may comprise IP phones and an associated computer terminal or alternatively only a computer terminal capable of making and receiving VOIP calls. The terminals 104-1, 104-2, 106 may also have user input hardware, such as a keyboard. The call server 102, user terminals 104-1, 104-2 and administrator terminal 106 may all reside on the same network, for example a LAN. Alternatively, the terminals 104-1, 104-2, 106 may be widely distributed and may communicate with the call server 102 over a WAN and/or the internet.

The call server 102 is configured to facilitate voice calls between the user terminals 104-1, 104-2 and customer phones. The telephony system 100 may include a normal customer phone 108, i.e. a phone not capable of using VOIP and a customer IP phone 110 which is configured to communicate using VOIP. In addition the telephony system too may include a customer computer terminal 112 through which the customer is able to conduct voice calls. The customer IP phone 110 and customer computer terminal 112 may be contacted by the call server 102 through the internet 114, while the normal customer phone 108 may be contacted by the call server via the PSTN 116.

In some embodiments, a voice call being conducted between one of the user terminals 104-1, 104-2 and one of the customer phones 108, 110 or terminals 112 comprises a number of call subsections. In these embodiments, the user reads a scripted statement and/or asks a scripted question and the customer responds. The user may then enter data relating to the customer's response into their terminal. Each round of user/customer dialogue and subsequent data entry constitutes a subsection of the call.

A sub-call timer is used to measure the length of the call subsections. The user inputs a predefined keystroke to signal the end of the current call subsection and reset the sub-call timer. The sub-call timer may reside on the user terminal 104, in which case, the user terminal is programmed to communicate the timing information to the call server 102 during or after the call. Alternatively, the sub-call timer may reside on the call server 102, in which case the user terminals 104 are programmed to indicate the times at which end of section keystrokes are received. The call server 102 then calculates the elapsed times for each call subsection.

The call server 102 is also programmed to perform further analysis on the recorded call subsection times in order to effect an improvement in the overall system. The call server 102 stores a list of subsection target times. Each call subsection may have a single predefined target time or a lower and upper boundary time. The call server 102 also aggregates the measured subsection time with previously measured times for the same subsection for that user. This generates a running per-user average for each call subsection. The call server 102 is programmed to compare the aggregate of the measured subsection times with the corresponding subsection target time and to record the difference. The call server 102 is also configured to send an alert when the recorded difference between the aggregate of the measured section times and the corresponding section target time is greater than a predetermined threshold. The alert may only be generated once a minimum number of subsection times have been aggregated, for example once 10 times for the same subsection have been aggregated. The alert may take any suitable form and may be sent to the administrator terminal 106.

Figure 2:
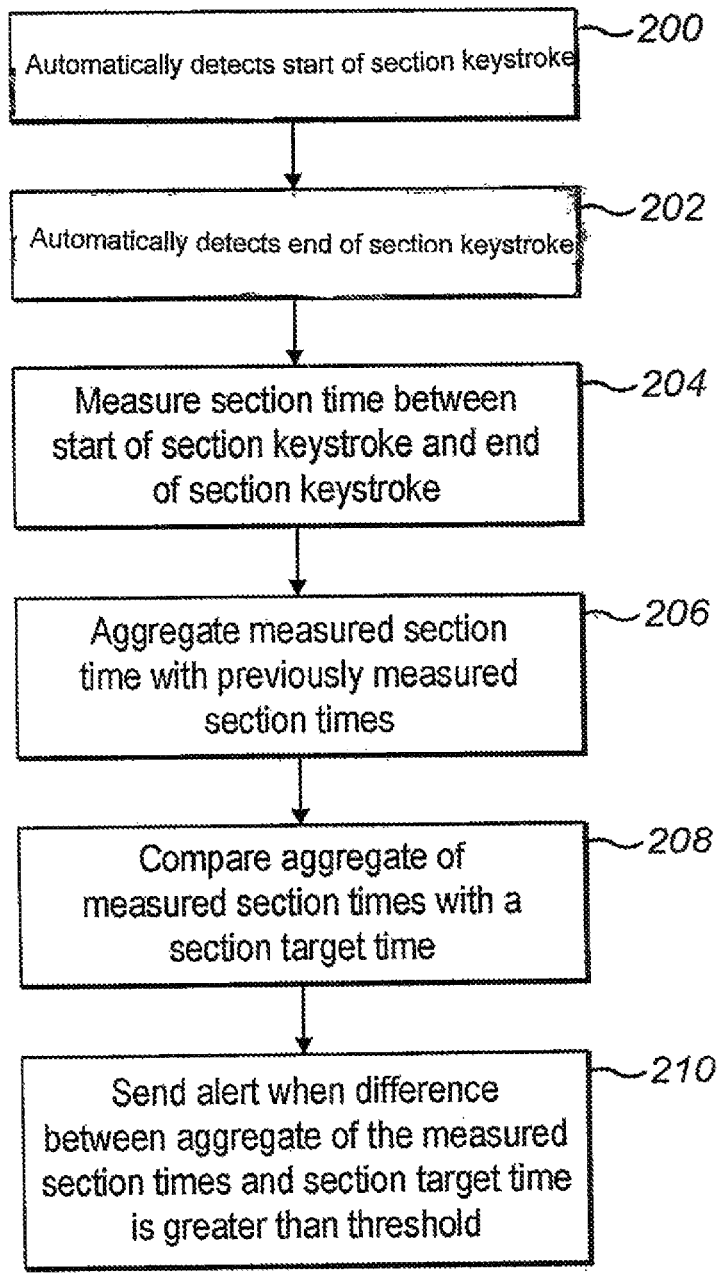
FIG. 2 is a flowchart showing steps performed by the telephony system of FIG. 1 according to some embodiments.

Turning now to FIG. 2, a flowchart is shows steps performed by the telephony system too of FIG. 1 according to some embodiments. In step 200 the system too detects a start of section keystroke. The keystroke may be input to the user terminal 104-1 by the user. The user terminal 104-1 may optionally communicate that the start of section keystroke has been received to the call server 102. In step 202 the system too detects an end of section keystroke. The keystroke may be input to the user terminal 104-1 by the user. The user terminal 104-1 may optionally communicate that the end of section keystroke has been received to the call server 102.

At step 204, the elapsed section time between the start of section keystroke and the end of section keystroke is measured. This step may be performed by a processor on the user terminal 104-1. In these embodiments, the user terminal 104-1 is programmed to start and stop a section timer in response to the start and end of section keystrokes respectively, and then to determine the elapsed time for that section in step 204. Alternatively, the elapsed section time between the start of section keystroke and the end of section keystroke may be measured by the call server 102. In these embodiments, the call server 102 receives timings signals from the user terminal 104-1 indicating the start and end of section keystrokes and uses these to start and stop a section timer, and then to determine the elapsed time for that section in step 204.

The start and end of section keystrokes may refer to the same keystroke used to move between sections of the scripted call. For example, tabbing to the next field in a questionnaire can be used as both the end of section keystroke for the section that has just been completed and as the start of section keystroke for the new section. In other words, the user does not need to perform extra steps to operate the sub-call timer. In some other embodiments, a dedicated key (for example Fit) may be assigned for the start and end of section keystrokes and that key may have no other function in the system.

At step 206, the section time measured in step 204 is aggregated with previously measured section times. The most recently measured section time is added to the sum of all the previously measured times for that section and the result divided by the total number of separate section times represented, in order to produce an average section time for the user. In some embodiments, this step may be performed by a processor on the user terminal 104-1. In these embodiments the user terminal 104-1 then sends the aggregated section time result to the call server 102. Alternatively, the aggregation may be performed by the call server 102.

At step 208, the call server 102 compares the aggregate of the measured section times with a section target time. The section target time is stored in a memory of the call server 102. In step 210, the call server 102 sends an alert when a difference between the aggregate of the measured section times and the section target time is greater than a predetermined threshold. The memory of the call server 102 also stores at least one predetermined threshold value. For example, the server 102 may store upper and lower thresholds, which may be different. The call server 102 may be programmed to compare the aggregate of the measured section times with a particular one of the thresholds, depending on whether the result of the comparison is positive or negative.

Figure 3:
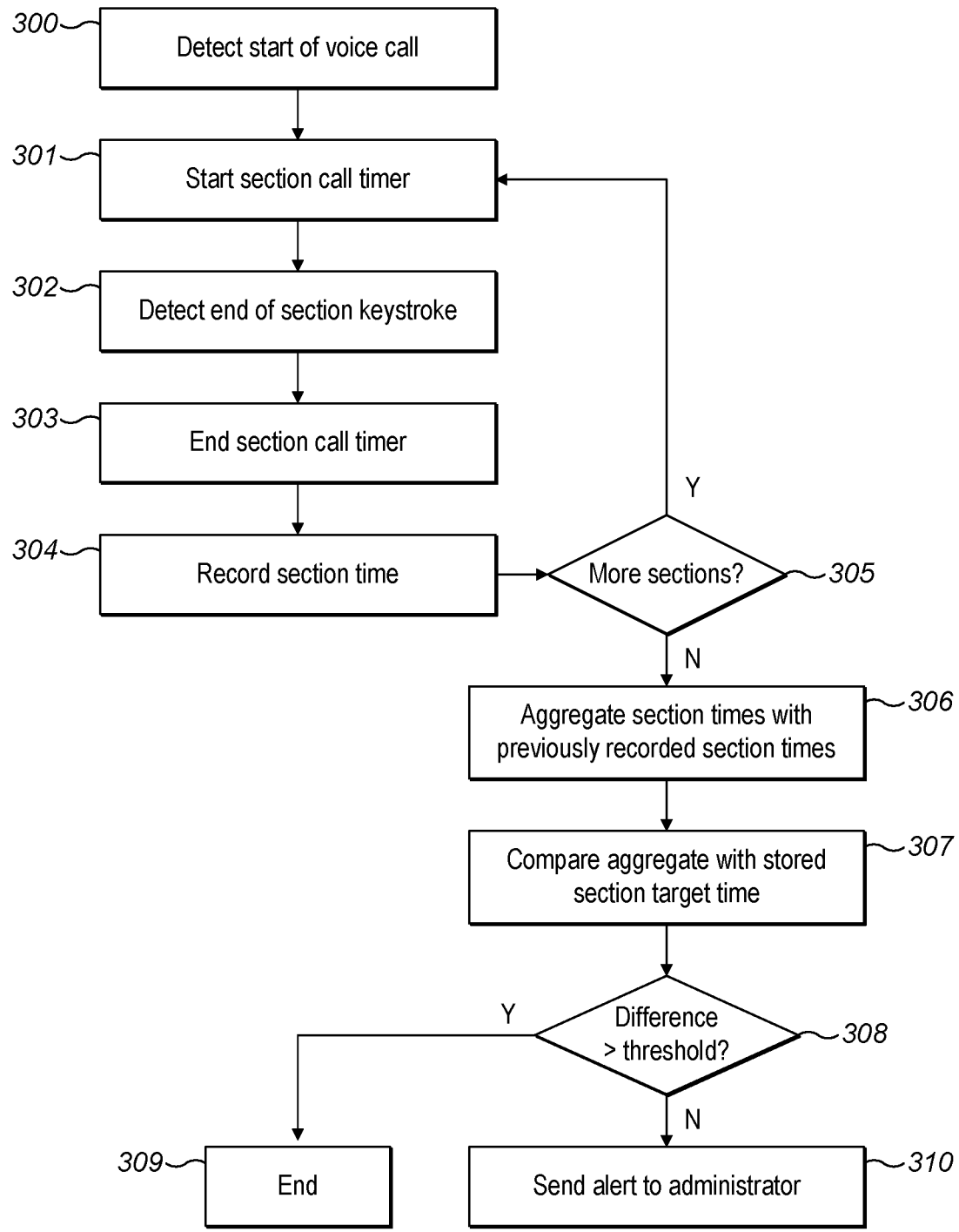
FIG. 3 is a flowchart showing additional steps performed by the telephony system of FIG. 1 according to some embodiments.

FIG. 3 is a flowchart showing additional steps performed by the telephony system too of FIG. 1 according to some embodiments. At step 300, the system too detects the start of a voice call between a user terminal 104-1 and customer phone 108, 110, 112. This detection may occur when the customer answers the phone call placed by the user terminal 104-1 or when the user terminal 104-1 is connected to a customer phone is which is on hold. The detection in step 300 may also occur when a customer calls the user and leaves the automated Interactive Voice Response queue and is connected to the user. For example the customer may be dialing into a system for technical support.

In response to the detection in step 300, at step 301 a section call timer is started. The section call timer may reside on the user terminal 104-1 or on the call server 102. At step 302 the system too detects an end of section keystroke. The keystroke may be input to the user terminal 104-1 by the user. The user terminal 104-1 may optionally communicate that the end of section keystroke has been received to the call server 102. In response to the detection in step 302, at step 303 the section call timer is ended. At step 304 the section time is recorded in the memory of the call server 102 (i.e. the elapsed time between the starting and ending of the section call timer is recorded).

At step 305 the system 104-1 determines whether there are more sections of the scripted phone call to be completed. The user terminal 104-1 may be programmed with the scripted phone call and may monitor the progress through the scripted sections. If there are more sections remaining in the call (YES at step 305) the process returns to step 301 and a new section call timer is started. The process loops steps 301 to 304 until all of the sections have been completed and the section times recorded. When there are no more sections remaining (NO at step 305) the process continues to step 306 in which the section times recorded in step 304 are aggregated with the previously recorded times for the respective sections. The most recently recorded section time is added to the sum of all the previously recorded times for that section and the result divided by the total number of separate section times represented, in order to produce an average section time for the user. In this embodiment, the sections times are recorded on the call server 102 and step 306 is performed by the call server 102.

At step 307, the call server 102 compares the aggregate of the recorded section times with a stored section target time in the memory of the call server 102. In step 308, the call server 102 determines whether the difference resulting from the comparison of step 307 is larger than a threshold value. The server 102 may store a single threshold value for each section, or a single +/−threshold criteria for each section, or different positive and negative threshold values for each section.

If the difference is not greater than the threshold value (NO at step 308) then the process ends at step 309 with no further action being taken. If the difference is greater than the threshold value (YES at step 308) then the process continues to step 310, in which the call server 102 sends an alert to an administrator, for example to administrator terminal 106. In some embodiments, the alert is only sent after a minimum number of recorded section times have been aggregated, for example 5 or 10 sections minimum.

As a first example, for a particular scripted section, the section target time may be 90 seconds and the threshold value used in step 308 may be ±15 seconds. The aggregate of the recorded sections times for a particular user may be 108 seconds, leading to a difference of 18 seconds. As the difference is greater than the threshold value, an alert would be sent to the administrator.

As a second example, for another scripted section, the section target time may be 30 seconds and the threshold value used in step 308 may be ±8 seconds. The aggregate of the recorded sections times for a particular user may be 27 seconds, leading to a difference of minus 3 seconds. As the difference is less than the threshold value, no alert is sent.

As the above examples illustrate, the operation of the telephony system 100 allows it to automatically identify users that are not completing the scripted sections in the desired time period without the need for manual intervention by an administrator and without any extra steps being required of the user.

A further advantage of the present system is that system 100 is able to identify particular scripted sections which are not being completed in the desired time period by a number of different users. To this end, the call server 102 may perform additional steps of (a) recording the number of different users whose aggregated times for a particular section exceed the section target time by the threshold value and (b) when the number of different users in this category exceeds a predefined number, sending a second alert to an administrator identifying the relevant section. This may help to identify scripted section which are poorly worded, or section target times which are impractical. Thus the present system allows both under-performing users and poorly worded sections to be automatically identified by a call server.

Figure 4:
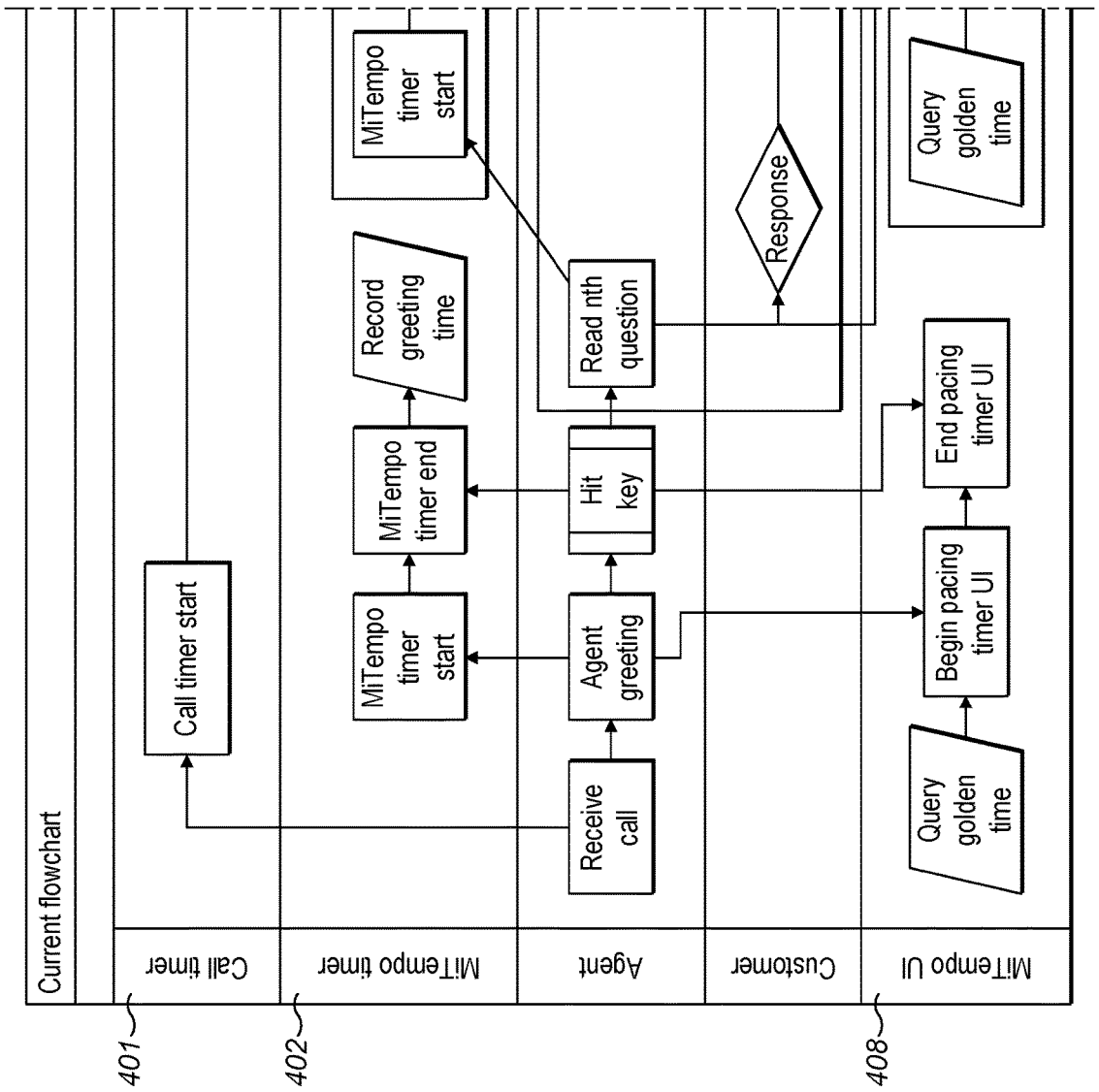
FIG. 4 is a flow diagram illustrating exemplary operation of the telephony system of FIG. 1 according to some embodiments.
Figure 4:
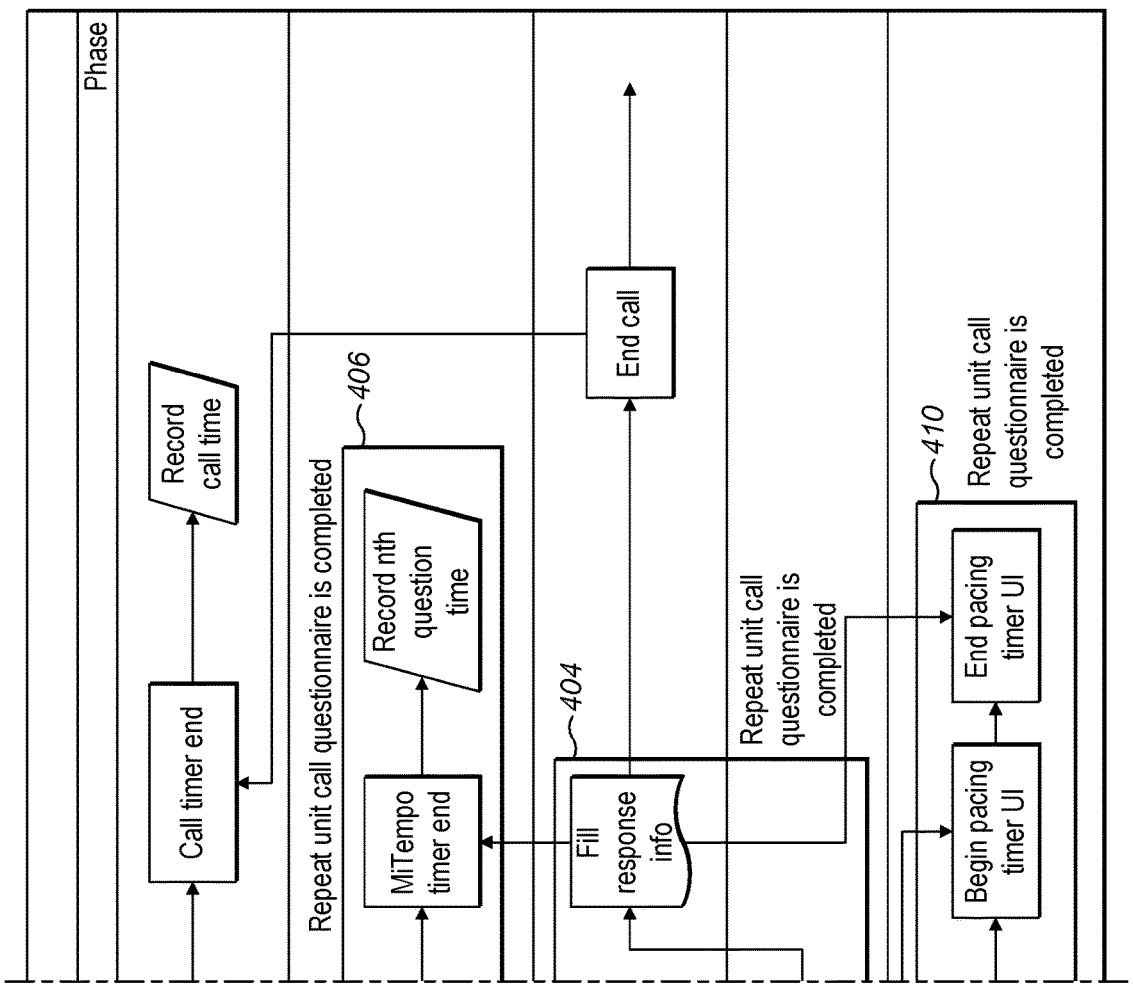

Referring to FIG. 4, further aspects and advantages of the telephony system can be appreciated. FIG. 4 is a flow chart illustrating where processes are carried out in an exemplary embodiment of the telephony system 100. FIG. 4 shows many of the same steps as are shown in FIGS. 2 and 3, although some of the nomenclature is altered. For example, the section call timer is referred to by the proprietary name MiTempo Timer and the section target time is referred to as a "golden time".

As can be seen, as well as featuring the MiTempo Timer 402, the system includes a separate call timer 400 for recording the total call time. The MiTempo Timer 402 initially records the length of the agent greeting, beginning when the call is received and ending when the agent hits a key to begin the first question in the scripted call. The system also features a user interface to assist the agent/user in completing each call section in the golden time/section target time. Although a golden time may be set for the agent greeting, this section may not form part of the automatic monitoring performed on the rest of the call and no alert may be sent if the agent greeting time exceeds or is below the set golden time. The agent then moves onto the processes in box 404. The agent reads aloud the first (nth) question, listens to the customer's response and then enters the response information. In response to the agent beginning the question, the MiTempo Timer 402 is started (box 406). In response to the agent finishing entering the response info, the MiTempo Timer 402 is stopped and the question time recorded. The agent repeats the processes in box 404 until all of the questions have been asked. The MiTempo Timer 402 repeats the processes in box 406 until the last question has been asked.

The golden time may be predefined in the system, or dynamically updated. For example the golden time may be based on the aggregated times of one or more experienced agents. Referring again to FIG. 1, the second user terminal 104-2 may be the terminal of one of these experience agents. The telephony system 100 may measure and aggregate the section times of this agent in the same way as described above, and may then use the aggregated section times as the section target times for the other users. This allows the other users to measure themselves against a golden standard for each section. In some other embodiments, the aggregated section times of a number of experience agents may be used as the section target time. This may better account for the natural variation in the speed at which different people speak.

Referring again to FIG. 4, the system also features a MiTempo user interface (UI) 408. As the user moves through each of the scripted call section, the golden time for each section is sent to the MiTempo UI 408. The UI then begins a pacing timer. This may be implemented in a number of ways, for example as a simple timer showing seconds elapsed or as a countdown timer which begins at the golden time and counts down. Alternatively, the script itself is displayed in the user interface and the individual words or whole sentences are highlighted at the correct pace to meet the golden time. As an alternative to highlighting a 'bouncing ball' animation may be used to indicate the pace at which the words should be spoken. The MiTempo UI 408 also feature a loop 410 which is performed in conjunction with the loop 404 by the agent and loop 406 by the MiTempo Timer 402. All three of the loops are linked to end of section keystrokes received at the user terminal 104-1.

During or at the end of the call, the agent is able to view their times for each section against the target/golden times for the sections. These may be shown as a fraction with the recorded times as the numerator and the section target times as the denominator. Colour coding may be used to indicate immediately to the agent which sections they performed well or badly on. For example, if the recorded time is within the predetermined threshold then the fraction may be colour coded green and if the recorded time exceeds the predetermined threshold then the fraction may be colour coded red.

These features provide the agents with a way to pace themselves against a golden standard for training and Service Level Agreement (SLA) timing requirements. Although the total call time provides some information, it does not allow poorly worded questions to be identified. If a question is poorly worded, agents may rush subsequent questions, resulting in the agent needing to repeat themselves and the target time being missed. Additionally it provides managers a way to measure agents' pacing and assess the timing and efficiency of written scripts. This in turn allows the scripts to be fine-tuned to better meet SLA requirements. It will also be appreciated that a question may be written in one language and then translated for use in other languages, but that the way in which the question is worded may be difficult and/or long-winded in the translation, leading to a longer time for reading the question. The present system allows this situation to be identified automatically, leading to a quicker resolution.

The concepts in the present disclosure may also be used to send text messages to a customer (rather than audio information) at a pace which is comfortable for the customer to read. This may be achieve by determining a time required to read the section of text to be sent, based on average reading speeds. The call server 102 then sends the section of text to the customer device or terminal capable of displaying the text. For example, the customer may be engaged in a text chat session with the agent. The call server 102 is programmed to prevent the sending by the agent of further text to the customer until the determined time has elapsed. In this way, the customer is not sent large sections of text in quick succession, or sent text at a rate which is too quick for them to comfortably read. This increases the overall quality of the chat experience for the customer.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:
1. A system comprising:
a user terminal;
a call server, configured to receive and route telephonic information, coupled to the user terminal;
a communication network coupled to the server; and
a phone coupled to the communication network,
wherein the user terminal, in response to detecting a start of a voice call from the phone automatically detects a start of section keystroke;
wherein the user terminal automatically detects an end of section keystroke;
wherein the system measures a section time between the start of section keystroke and the end of section keystroke;
wherein the server aggregates the measured section time with previously measured section times;
wherein the server compares the aggregate of the measured section times with a section target time; and
wherein the server sends an alert to an administrator terminal when a difference between the aggregate of the measured section times and the section target time is greater than a predetermined threshold.
2. The system of claim 1, wherein the user terminal sends measured time to the server during a call.
3. The system of claim 1, wherein the alert is sent only after a predetermined number of recorded section times have been aggregated.

* * * * *